United States Patent
Kim

(10) Patent No.: US 11,424,514 B2
(45) Date of Patent: Aug. 23, 2022

(54) BATTERY MODULE HAVING ELECTRODE TAB WITH PROTRUSION

(71) Applicant: Samsung SDI Co., Ltd., Yongin-si (KR)

(72) Inventor: Jaemin Kim, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 117 days.

(21) Appl. No.: 16/770,613

(22) PCT Filed: Aug. 29, 2018

(86) PCT No.: PCT/KR2018/009986
§ 371 (c)(1),
(2) Date: Jun. 7, 2020

(87) PCT Pub. No.: WO2019/112149
PCT Pub. Date: Jun. 13, 2019

(65) Prior Publication Data
US 2021/0175587 A1 Jun. 10, 2021

(30) Foreign Application Priority Data
Dec. 8, 2017 (KR) .................... 10-2017-0168474

(51) Int. Cl.
*H01M 50/502* (2021.01)
*H01M 50/531* (2021.01)
(Continued)

(52) U.S. Cl.
CPC ....... *H01M 50/502* (2021.01); *H01M 10/425* (2013.01); *H01M 50/531* (2021.01);
(Continued)

(58) Field of Classification Search
CPC ............ H01M 50/516; H01M 10/425; H01M 50/204; H01M 50/502; H01M 50/531;
(Continued)

(56) References Cited

U.S. PATENT DOCUMENTS 8,765,283 B2 7/2014 Um
9,694,449 B2 7/2017 Hwang
(Continued)

FOREIGN PATENT DOCUMENTS

CN 102376931 3/2012
JP 1999-195411 7/1999
(Continued)

OTHER PUBLICATIONS

International Search Report dated Dec. 4, 2018 issued in WO patent application No. PCT/KR2018/009986.
(Continued)

*Primary Examiner* — Kwang Han
(74) *Attorney, Agent, or Firm* — H.C. Park & Associates, PLC

(57) ABSTRACT

A battery module includes: a first battery cell including a first terminal at a top surface thereof; a second battery cell arranged adjacent to the first battery cell and including a second terminal arranged at a top surface thereof in substantially parallel to the first terminal; and an electrode tab electrically connecting the first terminal and the second terminal to each other, wherein the electrode tab includes: a first extension portion coupled to the first terminal and extending along an adjacent side portion of the first battery cell and the second battery cell; a second extension portion coupled to the second terminal and extending along the adjacent side portion in substantially parallel to the first extension portion; and a connection portion connected to the first extension portion and the second extension portion and including a protrusion portion protruding upward from the first battery cell and the second battery cell.

14 Claims, 7 Drawing Sheets

(51) Int. Cl.
*H01M 50/543* (2021.01)
*H01M 50/50* (2021.01)
*H01M 50/516* (2021.01)
*H01M 10/42* (2006.01)

(52) U.S. Cl.
CPC .......... *H01M 50/543* (2021.01); *H01M 50/50* (2021.01); *H01M 50/516* (2021.01)

(58) Field of Classification Search
CPC ............ H01M 50/543; H01M 50/519; H01M 50/507; H01M 50/20; H01M 50/50; H01M 50/289; H01M 50/569; H01M 50/209; H01M 50/284; H01M 50/55; H01M 50/553; Y02E 60/10
See application file for complete search history.

(56) References Cited

U.S. PATENT DOCUMENTS

| | | | |
|---|---|---|---|
| 2009/0305119 A1* | 12/2009 | Kim | H01M 50/147 429/93 |
| 2010/0151312 A1 | 6/2010 | Kim et al. | |
| 2010/0159287 A1 | 6/2010 | Kwag et al. | |
| 2010/0178549 A1 | 7/2010 | Moom | |
| 2011/0244310 A1 | 10/2011 | Kim | |
| 2011/0308856 A1* | 12/2011 | Park | H01M 50/50 174/84 R |
| 2014/0212706 A1 | 7/2014 | Ro et al. | |
| 2015/0064504 A1* | 3/2015 | Kim | H01M 50/107 429/7 |

FOREIGN PATENT DOCUMENTS

| | | |
|---|---|---|
| JP | 5063897 | 10/2012 |
| KR | 10-0890327 | 3/2009 |
| KR | 10-0933865 | 12/2009 |
| KR | 10-2010-0067464 | 6/2010 |
| KR | 10-2010-0082530 | 7/2010 |
| KR | 10-1023879 | 3/2011 |
| KR | 10-2012-0016569 | 2/2012 |
| KR | 10-2014-0097681 | 8/2014 |
| KR | 10-2016-0107704 | 9/2016 |

OTHER PUBLICATIONS

Chinese Office Action dated Feb. 21, 2022, for Chinese Patent Application No. 201880078409.1.

* cited by examiner

BATTERY MODULE HAVING ELECTRODE TAB WITH PROTRUSION

CROSS REFERENCE TO RELATED APPLICATIONS

This application is a National Stage Entry of International Patent Application No. PCT/KR2018/009986, filed on Aug. 29, 2018, and claims priority from and the benefit of Korean Patent Application No. 10-2017-0168474, filed on Dec. 8, 2017, each of which is hereby incorporated by reference for all purposes as if fully set forth herein.

BACKGROUND

Field

Exemplary implementation of the invention relate to battery modules, and more particularly, to a battery module capable of improving a coupling force between an electrode tab and an electrode terminal of a battery cell.

Discussion of the Background

Recently, with the rapid development of electronics and communications industries, mobile electronic devices such as cellular phones, notebook computers, camcorders, and personal digital assistants (PDAs) have been increasingly popularized. Rechargeable batteries as the power supply of mobile electronic devices have been widely used in consideration of economical efficiency.

Various types of secondary batteries such as nickel-cadmium batteries, lead batteries, nickel-hydrogen batteries, lithium ion batteries, and lithium polymer batteries have been developed. Such secondary batteries may be combined with a circuit to constitute a battery module and may be charged and discharged through an external terminal of the battery module.

A plurality of secondary batteries may be arranged to overlap each other in one direction, and in this case, electrode terminals of the secondary batteries adjacent to each other may be connected by an electrode tab. In general, the electrode tab may be welded to the electrode terminals.

The above information disclosed in this Background section is only for understanding of the background of the inventive concepts, and, therefore, it may contain information that does not constitute prior art.

SUMMARY

Applicant discovered that when a welding current is applied to an electrode tab and an electrode terminal, a leakage current may occur at a portion other than the electrode terminal of a secondary battery and thus a sufficient coupling may not be formed between the electrode tab and the electrode terminal.

Battery modules constructed according to the principles and exemplary implementations of the invention have solved several problems including the above problems. Further, the battery modules are capable of improving a coupling force between the electrode tab and the electrode terminal of a battery cell. For example, the coupling force between the electrode tab and the electrode terminal of the battery cell may be improved by reducing a leakage current generated during welding. Also, the welding efficiency thereof may be improved and thus the cost and time required for welding may be saved.

Additional features of the inventive concepts will be set forth in the description which follows, and in part will be apparent from the description, or may be learned by practice of the inventive concepts.

According to one aspect of the invention, a battery module includes a first battery cell including a first terminal at a top surface thereof; a second battery cell arranged adjacent to the first battery cell and including a second terminal arranged at a top surface thereof in substantially parallel to the first terminal; and an electrode tab electrically connecting the first terminal and the second terminal to each other, wherein the electrode tab includes: a first extension portion coupled to the first terminal and extending along an adjacent side portion of the first battery cell and the second battery cell; a second extension portion coupled to the second terminal and extending along the adjacent side portion in substantially parallel to the first extension portion; and a connection portion connected to the first extension portion and the second extension portion and including a protrusion portion protruding upward from the first battery cell and the second battery cell.

The battery module may further include a circuit board arranged to cover at least a portion of the top surfaces of the first battery cell and the second battery cell and including a connection hole, wherein the electrode tab includes a bent portion bent toward the circuit board and inserted into the connection hole.

The first extension portion may include a first coupling region welded to the first terminal, and the second extension portion includes a second coupling region welded to the second terminal.

The protrusion portion may be arranged more adjacent to a center of the first battery cell than the first coupling region and is arranged more adjacent to a center of the second battery cell than the second coupling region.

The first extension portion may include a first coupling point and a second coupling point contacting the first terminal, and a first intermediate hole formed between the first coupling point and the second coupling point, and the second extension portion may include a third coupling point and a fourth coupling point contacting the second terminal, and a second intermediate hole formed between the third coupling point and the fourth coupling point.

The protrusion portion may include a round portion that is downward convex, and a distance substantially parallel to the adjacent side portion from an edge of the first intermediate hole adjacent to the protrusion portion to a rear end of the round portion is about 5 mm or more.

The protrusion portion may include a round portion that is downward convex, and a distance substantially parallel to the adjacent side portion from an edge of the second intermediate hole adjacent to the protrusion portion to a rear end of the round portion is about 5 mm or more.

The protrusion portion may be arranged between the first extension portion and the second extension portion.

The protrusion portion may be formed to be symmetrical with respect to a center line between the first battery cell and the second battery cell.

The protrusion portion may include a round portion that is downward convex.

The first battery cell may include a first protrusion portion protruding upward along a side portion of the top surface of the first battery cell, and the second battery cell includes a second protrusion portion protruding upward along a side portion of the top surface of the second battery cell.

The protrusion portion may include a round portion that is downward convex, a distance substantially perpendicular to the adjacent side portion from a portion of the first protrusion portion adjacent to the second battery cell to one side end of the round portion toward the first battery cell is about 0.5 mm or more, and a distance substantially perpendicular to the adjacent side portion from a portion of the second protrusion portion adjacent to the first battery cell to one side end of the round portion toward the second battery cell is about 0.5 mm or more.

The protrusion portion may be spaced apart from the first protrusion portion and the second protrusion portion.

A spacing distance between the top surface of the first battery cell and an uppermost portion of the protrusion portion may be about 0.2 mm or more, and a spacing distance between the top surface of the second battery cell and the uppermost portion of the protrusion portion may be about 0.2 mm or more.

It is to be understood that both the foregoing general description and the following detailed description are exemplary and explanatory and are intended to provide further explanation of the invention as claimed.

BRIEF DESCRIPTION OF DRAWINGS

The accompanying drawings, which are included to provide a further understanding of the invention and are incorporated in and constitute a part of this specification, illustrate exemplary embodiments of the invention, and together with the description serve to explain the inventive concepts.

DETAILED DESCRIPTION

Figure 1:
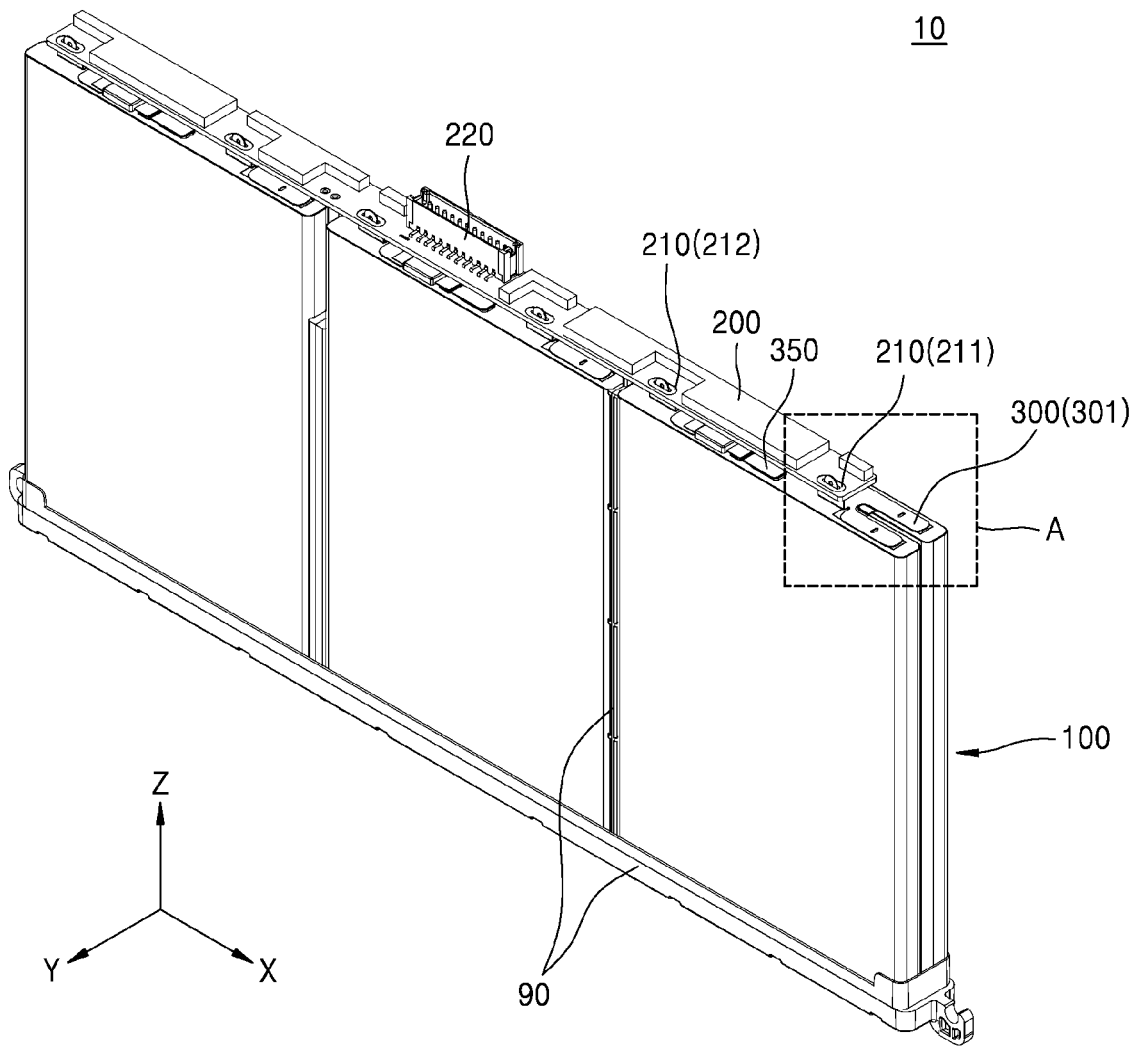
FIG. 1 is a perspective view of an exemplary embodiment of a battery module constructed according to the principles of the invention.

In the following description, for the purposes of explanation, numerous specific details are set forth in order to provide a thorough understanding of various exemplary embodiments or implementations of the invention. As used herein "embodiments" and "implementations" are interchangeable words that are non-limiting examples of devices or methods employing one or more of the inventive concepts disclosed herein. It is apparent, however, that various exemplary embodiments may be practiced without these specific details or with one or more equivalent arrangements. In other instances, well-known structures and devices are shown in block diagram form in order to avoid unnecessarily obscuring various exemplary embodiments. Further, various exemplary embodiments may be different, but do not have to be exclusive. For example, specific shapes, configurations, and characteristics of an exemplary embodiment may be used or implemented in another exemplary embodiment without departing from the inventive concepts.

Unless otherwise specified, the illustrated exemplary embodiments are to be understood as providing exemplary features of varying detail of some ways in which the inventive concepts may be implemented in practice. Therefore, unless otherwise specified, the features, components, modules, layers, films, panels, regions, and/or aspects, etc. (hereinafter individually or collectively referred to as "elements"), of the various embodiments may be otherwise combined, separated, interchanged, and/or rearranged without departing from the inventive concepts.

The use of cross-hatching and/or shading in the accompanying drawings is generally provided to clarify boundaries between adjacent elements. As such, neither the presence nor the absence of cross-hatching or shading conveys or indicates any preference or requirement for particular materials, material properties, dimensions, proportions, commonalities between illustrated elements, and/or any other characteristic, attribute, property, etc., of the elements, unless specified. Further, in the accompanying drawings, the size and relative sizes of elements may be exaggerated for clarity and/or descriptive purposes. When an exemplary embodiment may be implemented differently, a specific process order may be performed differently from the described order. For example, two consecutively described processes may be performed substantially at the same time or performed in an order opposite to the described order. Also, like reference numerals denote like elements.

When an element, such as a layer, is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. To this end, the term "connected" may refer to physical, electrical, and/or fluid connection, with or without intervening elements. Further, the D1-axis, the D2-axis, and the D3-axis are not limited to three axes of a rectangular coordinate system, such as the x, y, and z-axes, and may be interpreted in a broader sense. For example, the D1-axis, the D2-axis, and the D3-axis may be perpendicular to one another, or may represent different directions that are not perpendicular to one another. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. As used herein, the term "and/or" includes any and all combinations of one or more of the associated listed items.

Although the terms "first," "second," etc. may be used herein to describe various types of elements, these elements should not be limited by these terms. These terms are used to distinguish one element from another element. Thus, a first element discussed below could be termed a second element without departing from the teachings of the disclosure.

Spatially relative terms, such as "beneath," "below," "under," "lower," "above," "upper," "over," "higher," "side" (e.g., as in "sidewall"), and the like, may be used herein for descriptive purposes, and, thereby, to describe one elements relationship to another element(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the exemplary term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof. It is also noted that, as used herein, the terms "substantially," "about," and other similar terms, are used as terms of approximation and not as terms of degree, and, as such, are utilized to account for inherent deviations in measured, calculated, and/or provided values that would be recognized by one of ordinary skill in the art.

Various exemplary embodiments are described herein with reference to sectional and/or exploded illustrations that are schematic illustrations of idealized exemplary embodiments and/or intermediate structures. As such, variations from the shapes of the illustrations as a result, for example, of manufacturing techniques and/or tolerances, are to be expected. Thus, exemplary embodiments disclosed herein should not necessarily be construed as limited to the particular illustrated shapes of regions, but are to include deviations in shapes that result from, for instance, manufacturing. In this manner, regions illustrated in the drawings may be schematic in nature and the shapes of these regions may not reflect actual shapes of regions of a device and, as such, are not necessarily intended to be limiting.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and should not be interpreted in an idealized or overly formal sense, unless expressly so defined herein.

Hereinafter, embodiments of the invention will be described in detail with reference to the accompanying drawings, and in the following description, like reference numerals will be used to denote like elements and redundant descriptions thereof will be omitted for conciseness. In the drawings, thicknesses are enlarged to clearly represent layers and regions. Also, in the drawings, the thicknesses of some layers and regions are exaggerated for convenience of description.

Figure 2:
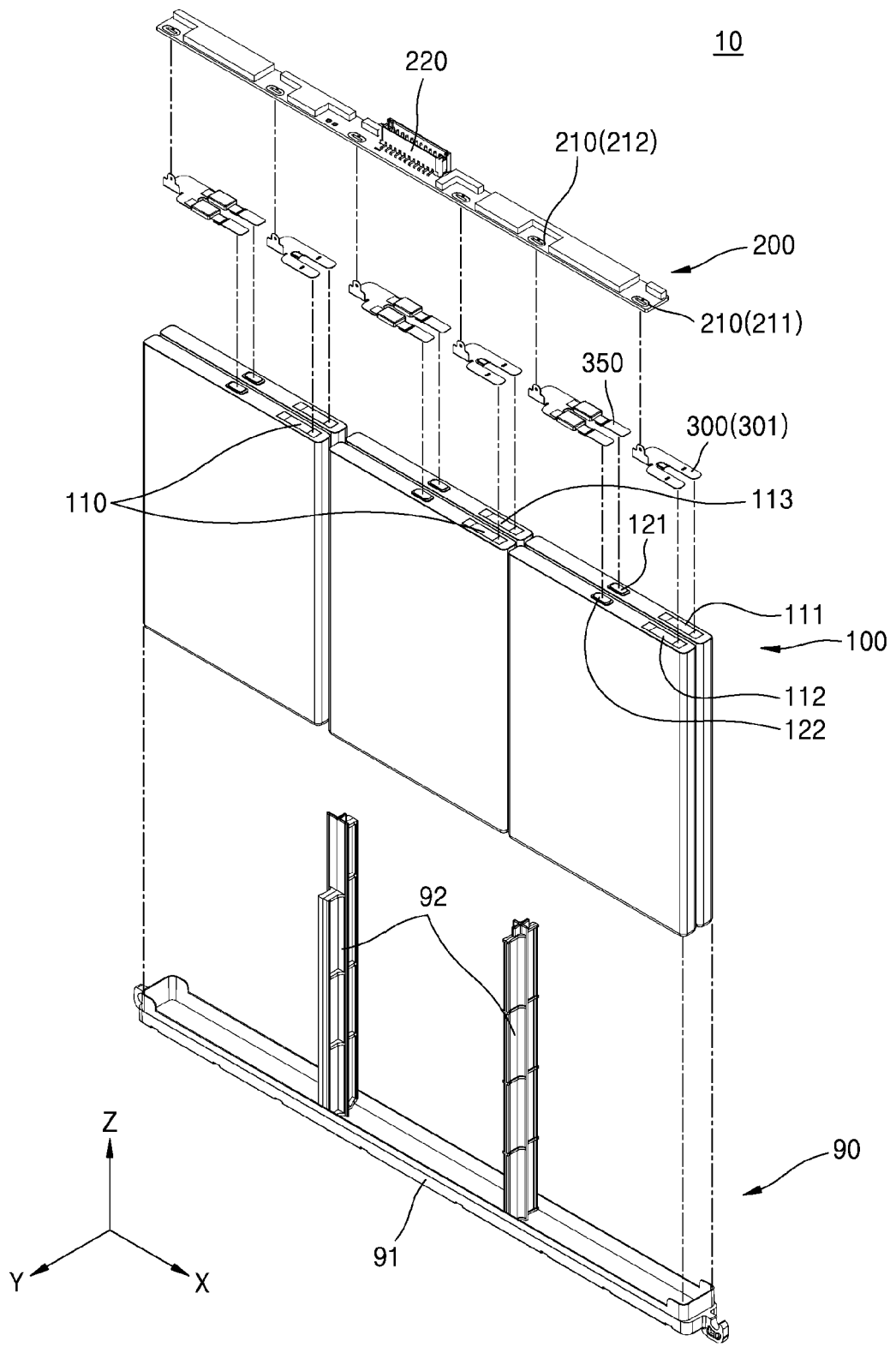
FIG. 2 is an exploded perspective view of the battery module of FIG. 1.

FIG. 1 is a perspective view of an exemplary embodiment of a battery module constructed according to the principles of the invention, and FIG. 2 is an exploded perspective view of the battery module of FIG. 1.

Referring to FIGS. 1 and 2, a battery module 10 according to an exemplary embodiment may include a plurality of battery cells 100, a circuit board 200, and an electrode tab 300.

For example, the battery cells 100 may be secondary batteries that are rechargeable, for example, lithium ion batteries or lithium polymer batteries. In an exemplary embodiment, the battery cells 100 may be square batteries, and a structure of the battery module 10 will be described in detail with reference to a case where the battery cells 100 are square batteries.

The battery cells 100 may be arranged in a first direction (X direction) and/or a second direction (Y direction), and in this case, the number of battery cells in the first direction (X direction) and the number of battery cells in the second direction (Y direction) may be variously modified according to designs. Thus, the battery cells 100 of 2 rows and 3 columns illustrated in FIG. 1 are merely examples, and at least one pair of battery cells may be arranged in the second direction (Y direction) in the battery module 10 according to an exemplary embodiment.

Here, the first direction (X direction) means a row direction in which the battery cells 100 are arranged, which may be a long-side direction of a rectangular top surface in the case that the battery cell has the rectangular top surface. Here, the second direction (Y direction) means a column direction in which the battery cells 100 are arranged, which may be a short-side direction of a rectangular top surface in the case that the battery cell has the rectangular top surface. Thus, hereinafter, for descriptive convenience, the term "first direction (X direction)" will be used instead of the row direction and the long-side direction and the term "second direction (Y direction)" will be used instead of the column direction and the short-side direction.

For example, a case 90 for supporting the battery cells 100 may be further provided to align and fix the battery cells 100. Although FIG. 1 or the like illustrates that a lower end portion of the battery cells 100 is inserted into the case 90, exemplary embodiments are not limited thereto. For example, the case 90 may be formed to accommodate all of the battery cells 100 or to surround the outer surface of the battery cells 100.

In an exemplary embodiment, the case 90 may include an insertion portion 91 and a separation portion 92. The insertion portion 91 may be a portion into which the battery cells 100 are inserted, and the separation portion 92 may be a portion for separating adjacent cells among the battery cells 100. Although FIG. 2 or the like illustrates that the separation portion 92 is arranged between each pair of battery cells arranged in the second direction (Y direction), the structure and position of the separation portion 92 may be variously modified according to designs.

By using the case 90 having the above structure, the battery cells 100 may be easily aligned in a plurality of rows and a plurality of columns, and necessary components may be stably coupled to the battery cells 100.

Referring to FIG. 2, each of the battery cells 100 may include an electrode terminal 110 at a top surface thereof. The electrode terminal 110 of each battery cell may include terminals 111 and 121 having two different polarities. For example, the terminals 111 and 121 may be arranged on the top surface of the battery cell to be spaced apart from each other. Also, adjacent terminals 121 and 113 of two battery cells adjacent to each other in the first direction (X direction) may have different polarities from each other. For example, adjacent terminals 111 and 112 of two battery cells adjacent to each other in the second direction (Y direction) may have the same polarity.

The circuit board 200 may be arranged over the battery cells 100. The circuit board 200 may be arranged to cover at least a portion of the top surfaces of the battery cells 100. The circuit board 200 may prevent the battery cells 100 from being overcharged or overdischarged, may extend the charge/discharge life of the battery cells 100, and may prevent the battery cells 100 from being short-circuited by a charger or an external terminal.

The circuit board 200 may be a base board with a printed circuit pattern formed thereon and may include various electronic devices to control and monitor the charge/discharge operation of the battery cells 100. Accordingly, the circuit board 200 may measure the voltage and the temperature of the battery cells 100 and perform balancing of the battery cells 100 based on the measured values.

The circuit board 200 may include a connection hole 210. The connection hole 210 may be a through hole formed at a certain position of the circuit board 200 and may be formed in plurality. The connection hole 210 may include a first connection hole 211 and a second connection hole 212. For example, the electrode tab 300 may be inserted into the first connection hole 211, and a heat blocking member 350 may be inserted into the second connection hole 212.

Also, the circuit board 200 may further include a connector 220. The connector 220 may be a portion for connecting to an external electronic device. For example, through the connector 220, the circuit board 200 may receive power from the external electronic device, and exchange signals with the external electronic device.

The electrode tab 300 may be coupled to each of adjacent electrode terminals 110 to electrically connect the adjacent electrode terminals 110. For this purpose, the electrode tab 300 may be formed of a conductive metal such as gold, silver, copper, nickel, aluminum, copper alloy, or aluminum alloy. In an exemplary embodiment, the electrode tab 300 may electrically connect the electrode terminals 111 and 121 of a pair of battery cells arranged in the second direction (Y direction).

As described above, the electrode tab 300 may be inserted into the first connection hole 211 of the circuit board 200. Accordingly, the electrode terminal 110 and the circuit board 200 may be electrically connected to each other through the electrode tab 300 such that the circuit board 200 may control and monitor the charge/discharge operation of each of the battery cells 100. For example, a particular shape of the electrode tab 300 will be described below with reference to FIG. 3 and the like. However, exemplary embodiments are not limited thereto.

The heat blocking member 350 may be coupled to the top surface of the battery cells 100 and may be arranged on one side of the electrode tab 300. The heat blocking member 350 may include a temperature measuring element for measuring the temperature of each of the battery cells 100, thereby blocking a current flowing through the battery cells 100 when the battery module 10 is overheated. The heat blocking member 350 may be coupled to terminals 121 and 122 having an opposite polarity to the terminals 111 and 112 to which the electrode tab 300 is coupled, to perform the same or similar function as the electrode tab 300. For example, the heat blocking member 350 may be inserted into the second connection hole 212 of the circuit board 200 to electrically connect the circuit board 200 to the terminals 121 and 122.

Figure 3:
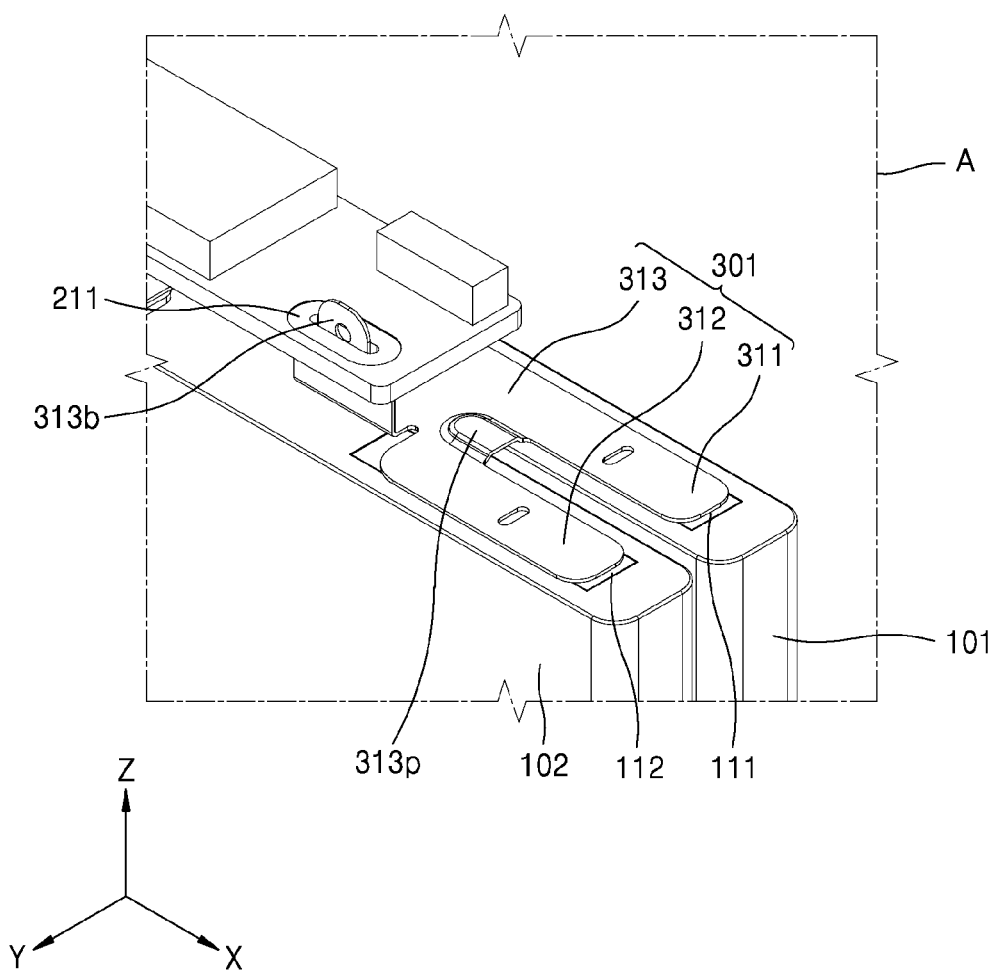
FIG. 3 is an enlarged perspective view of a region A of FIG. 1.
Figure 4:
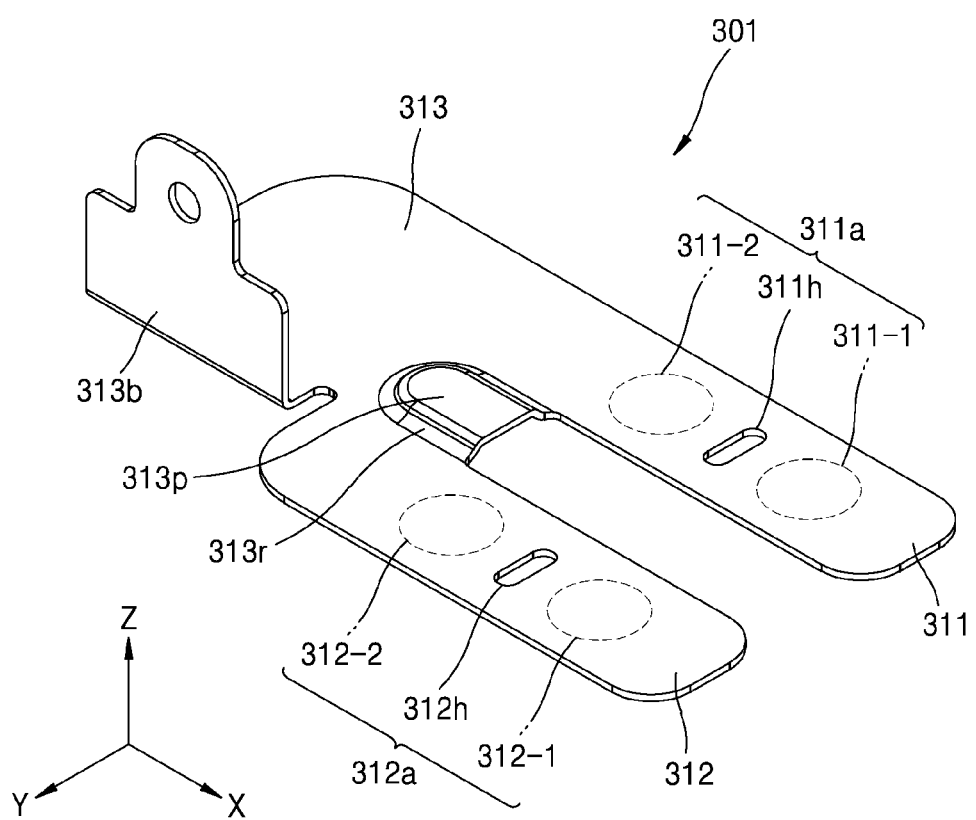
FIG. 4 is a perspective view of an electrode tab of the battery module of FIG. 1.

FIG. 3 is an enlarged perspective view of a region A of FIG. 1, and FIG. 4 is a perspective view of an electrode tab of the battery module of FIG. 1.

Referring to FIGS. 3 and 4, the battery cells 100 may include a first battery cell 101 and a second battery cell 102 arranged in the second direction (Y direction).

The first battery cell 101 may have a substantially rectangular top surface and may include a first terminal 111 at one end of the top surface. The second battery cell 102 may be arranged adjacent to the first battery cell 101, and particularly, a wide surface of the first battery cell 101 and a wide surface of the second battery cell 102 may be arranged to face each other. The second battery cell 102 may also have a substantially rectangular top surface and may include a second terminal 112 at one end of the top surface. Accordingly, the first terminal 111 and the second terminal 112 may be arranged in parallel to each other. In exemplary embodiments, the first battery cell 101 and the second battery cell 102 may have the top surfaces with various shapes.

An electrode tab 301 may be coupled to the first terminal 111 and the second terminal 112. Accordingly, the first terminal 111 and the second terminal 112 may be electrically connected to each other. There may be various ways in which the electrode terminals 111 and 112 are coupled to the electrode tab 301. For example, in an exemplary embodiment, the electrode terminals 111 and 112 and the electrode tab 301 may be joined by melting at least one of the electrode terminals 111 and 112 and the electrode tab 301 by using a welding method.

In an exemplary embodiment, the electrode tab 301 may include a first extension portion 311, a second extension portion 312, and a connection portion 313.

The first extension portion 311 may be a portion for connecting to the first terminal 111 of the first battery cell 101 and may extend in the first direction (X direction). Referring to FIG. 4, the first extension portion 311 may include a first coupling region 311a welded to the first terminal 111, and the first coupling region 311a may include a first coupling point 311-1, a second coupling points 311-2, and a first intermediate hole 311h formed between the first coupling point 311-1 and the second coupling point 311-2.

For example, the first coupling point 311-1 and the second coupling point 311-2 may be a region where the first extension portion 311 and the first terminal 111 are melt-joined and may correspond to a region where a welding rod is arranged. Thus, when the welding rod is guided to a certain position on the first extension portion 311, the first coupling point 311-1 and the second coupling point 311-2 may be formed to substantially correspond to the certain position. In this case, the certain position may be defined by a spacing distance from the first intermediate hole 311h.

The first intermediate hole 311h may be formed to have a slot shape extending in the second direction (Y direction). The first intermediate hole 311h may function as a guide for guiding the welding rod onto the first coupling point 311-1 and the second coupling point 311-2 as described above and may absorb the expansion of the first extension portion 311 by the heat generated during a welding operation.

The second extension portion 312 may be arranged on the second battery cell 102 in parallel to the first extension portion 311. For example, the second extension portion 312 may be formed to extend in the first direction (X direction) to be coupled to the second terminal 112 and may include a second coupling region 312a. In this case, the second coupling region 312a may be a region welded to the second terminal 112 and may include a third coupling point 312-1, a fourth coupling point 312-2, and a second intermediate hole 312h formed between the third coupling point 312-1 and the fourth coupling point 312-2.

The third coupling point 312-1 and the fourth coupling point 312-2 may be a region where the second extension portion 312 and the second terminal 112 are melt-joined and may correspond to a region where a welding rod is arranged. Also, the second intermediate hole 312h having a slot shape extending in the second direction (Y direction) may be a reference for aligning the welding rod like the first intermediate hole 311h and may absorb the thermal expansion of the second extension portion 312.

Meanwhile, the number of coupling points formed in each of the first coupling region 311a and the second coupling region 312a during a welding operation is not necessarily limited to two, and one or three or more welding points may be formed in the first coupling region 311a and the second coupling region 312a. In addition, the positions of the intermediate holes may also be variously modified according to designs.

The connection portion 313 may be a portion for connecting the first extension portion 311 and the second extension portion 312 and may include a protrusion portion 313p protruding upward from the first battery cell 101 and the second battery cell 102. Particularly, the protrusion portion 313p may be arranged between the first extension portion 311 and the second extension portion 312, and more particularly, the protrusion portion 313p may be formed on the rear-end side of the first extension portion 311 and the second extension portion 312 and may be arranged to contact a space between the first extension portion 311 and the second extension portion 312. Thus, the protrusion portion 313p may be arranged more adjacent to the center of the first battery cell 101 than the first coupling region 311a of the first extension portion 311 and may be arranged more adjacent to the center of the second battery cell 102 than the second coupling region 312a of the second extension portion 312.

The protrusion portion 313p may be formed to have various shapes. For example, one end thereof may be formed in the shape of a partial circle as illustrated in FIG. 3 or the like, but, exemplary embodiments are not limited thereto. For example, one end of the protrusion portion 313p may be formed in the shape of a partial polygon, a partial ellipse, or the like.

The protrusion portion 313p may be formed by various methods. For example, the protrusion portion 313p may be formed by using a punch. When the protrusion portion 313p is formed by a punch, the punch may be transferred in the upward direction (Z direction), which is the thickness direction of the connection portion 313. Thus, a round portion 313r, which is downward convex, may be formed at the protrusion portion 313p. For example, the round portion 313r may be a portion where plastic deformation is started by a punching process or the like.

Also, the connection portion 313 may further include a bent portion 313b. The bent portion 313b may be formed to be bent in the upward direction (Z direction) from a flat portion of the connection portion 313 to be inserted into the first connection hole 211 illustrated in FIG. 3. Accordingly, the first terminal 111 and the second terminal 112 may be electrically connected to the circuit board 200 through the connection portion 313.

Figure 5:
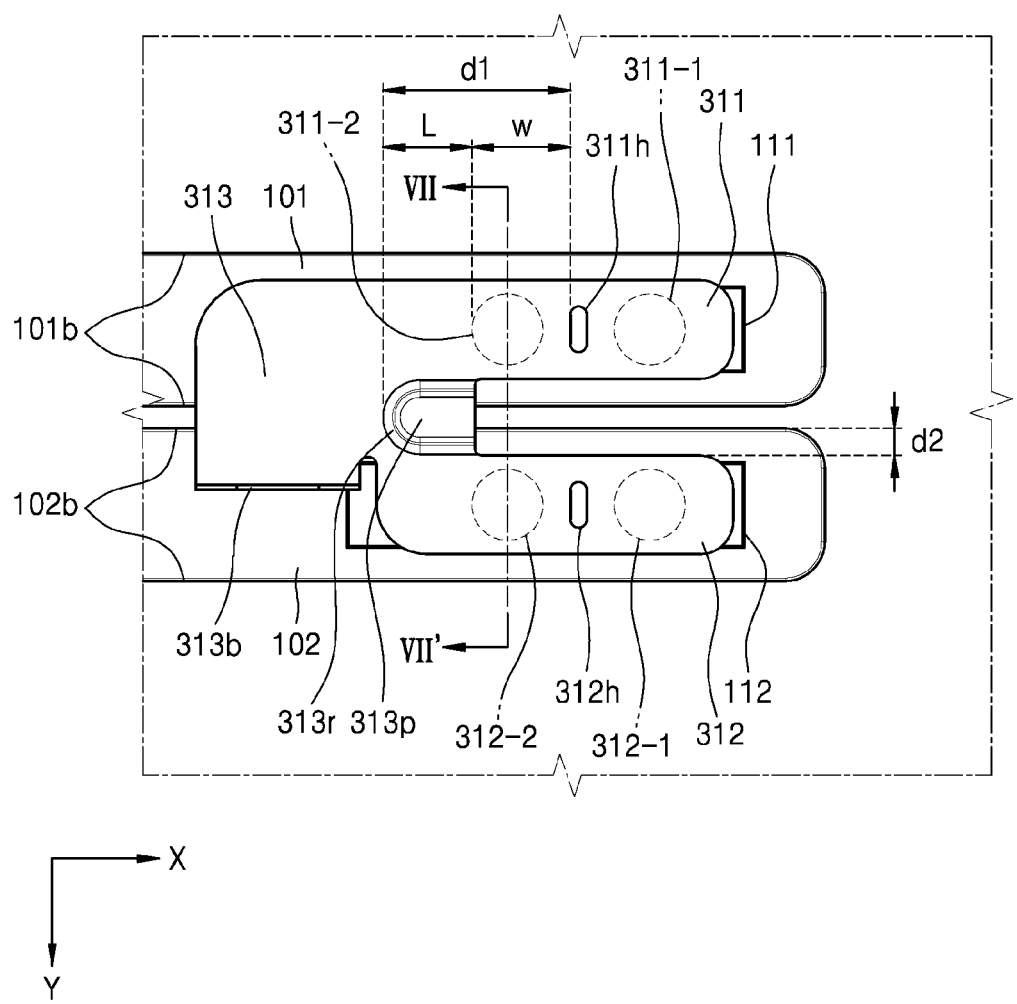
FIG. 5 is a plan view schematically illustrating a state in which the electrode tab of FIG. 4 is welded to an electrode terminal.
Figure 6:
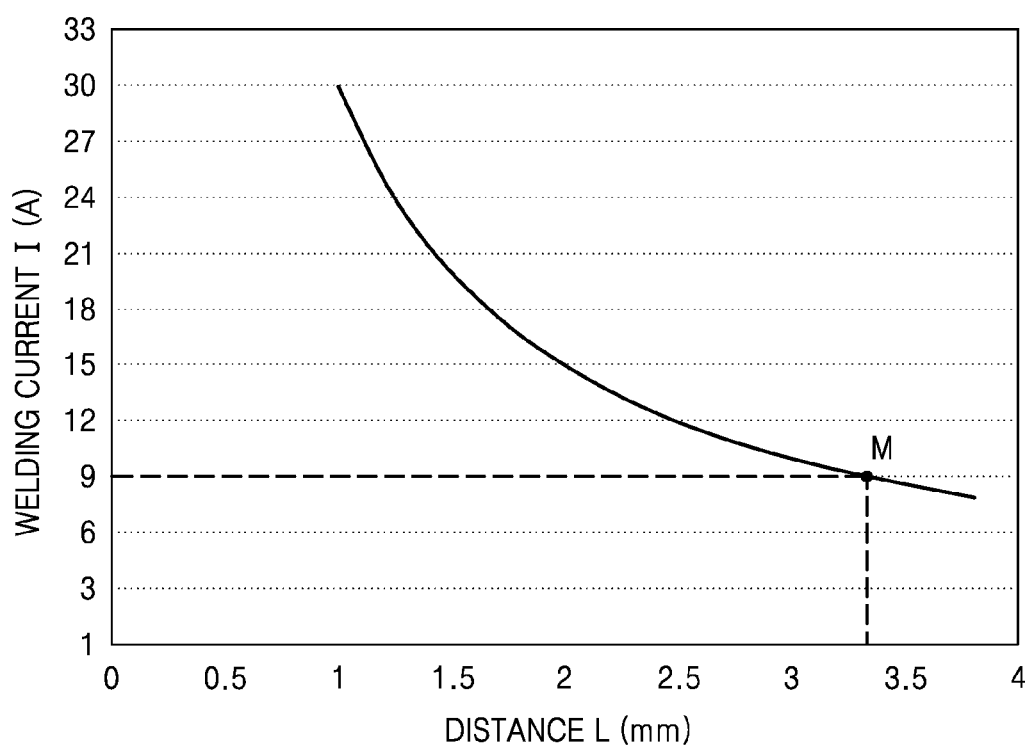
FIG. 6 is a graph illustrating a change in a welding current I according to a distance L of FIG. 5.
Figure 7:
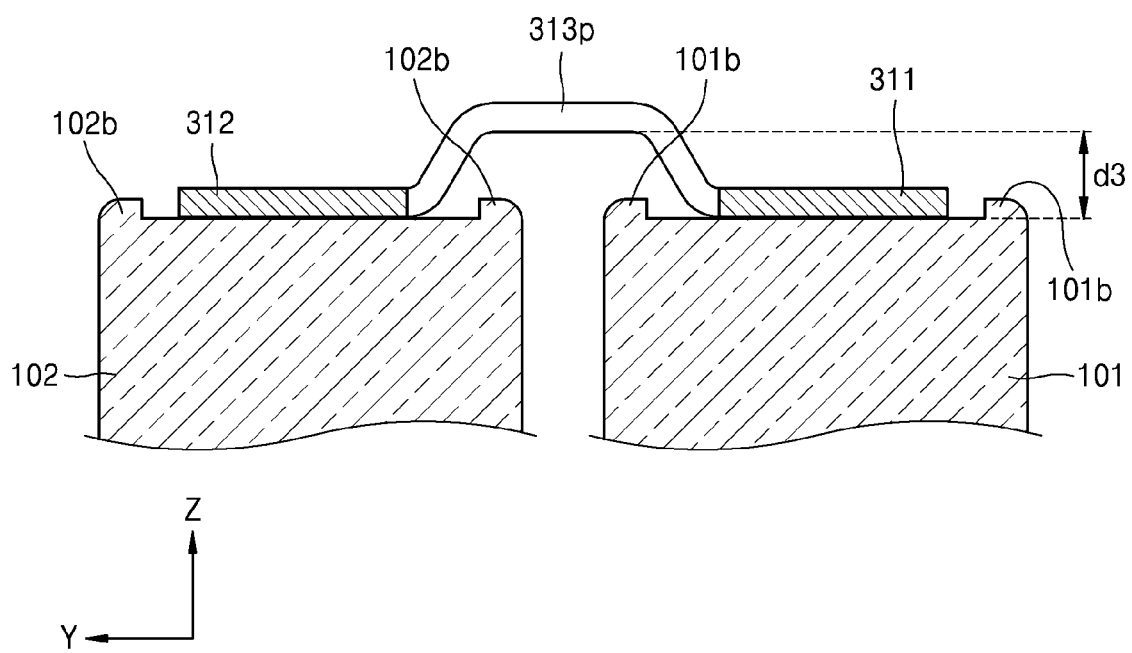
FIG. 7 is a cross-sectional view taken along line VII-VII' of FIG. 5.

FIG. 5 is a plan view schematically illustrating a state in which the electrode tab of FIG. 4 is welded to an electrode terminal, FIG. 6 is a graph illustrating a change in a welding current I according to distance L of FIG. 5, and FIG. 7 is a cross-sectional view taken along line VII-VII' of FIG. 5.

Referring to FIG. 5, in order to couple the first extension portion 311 and the second extension portion 312 respectively to the first terminal 111 and the second terminal 112, a welding rod may be arranged at the first coupling point 311-1 and the second coupling point 311-2 on the first extension portion 311, and may be arranged at the third coupling point 312-1 and the fourth coupling point 312-2 on the second extension portion 312.

When a welding operation is performed by using the welding rods, a current applied to the welding rods may be induced at the first extension portion 311 and the second extension portion 312. In this case, heat may be generated by the current induced at the first extension portion 311 and the second extension portion 312, and the first extension portion 311 and the second extension portion 312 are melted by the heat to be joined to the first terminal 111 and the second terminal 112 respectively. In addition to the first extension portion 311 and the second extension portion 312, a welding current may also induced at the first terminal 111 and the second terminal 112 to cause melting therein.

For example, the first battery cell 101 may include a first protrusion portion 101b along the edge of the top surface thereof, and the second battery cell 102 may include a second protrusion portion 102b along the edge of the top surface thereof. The first protrusion portion 101b and the second protrusion portion 102b may be relatively short protrusions protruding upward, and when a welding current is applied to welding rods as described above, a portion of the welding current may leak to the first protrusion portion 101b and the second protrusion portion 102b. Thus, in the battery module according to an exemplary embodiment, the protrusion portion 313p may be formed at the connection portion 313 to prevent the electrode tab 300 or 301 from contacting the first and second protrusion portions 101b and 102b described above. Accordingly, it may be possible to minimize the leakage of a current to the first and second protrusion portions 101b and 102b during a welding operation.

Also, the protrusion portion 313p may be formed to be symmetrical with respect to a center line between the first battery cell 101 and the second battery cell 102. Accordingly, it may be possible to prevent a thermal effect or the like caused by a leakage current from occurring unevenly in the first battery cell 101 and the second battery cell 102.

As described above, in order to prevent a welding defect caused by a leakage current, for example, a decrease in the coupling force therebetween or occurrence of an unwelded portion, the protrusion portion 313p may be formed to have a predetermined area.

Thus, the protrusion portion 313p may be formed to have a predetermined length in the first direction (X direction). Particularly, a first distance d1 from the edge of the first intermediate hole 311h adjacent to the protrusion portion 313p to the rear end of the round portion 313r may be about 5 mm or more. Here, the first distance d1 may be defined as a distance in the first direction (X direction).

The first distance d1 may be derived through a graph illustrated in FIG. 6. The graph illustrates a change in a welding current I according to adjustment distance L, wherein the adjustment distance L may be a distance from the edge of the second coupling point 311-2 adjacent to the protrusion portion 313p to the rear end of the round portion 313r. Referring to FIG. 6, as the welding current I is decreased to 9 A or less, the adjustment distance L is increased to about 3.4 mm or more. For example, at the point M, the welding current I is about 9 A, and the adjustment distance L is about 3.4 mm.

When the welding current I exceeds 9 A, because a leakage current may occur to a welding defect, the welding current I may be reduced to 9 A or less by setting the adjustment distance L to about 3.4 mm or more. In this case, because a welding standard distance w from the edge of the first intermediate hole 311h adjacent to the protrusion portion 313p to the edge of the second coupling point 311-2 adjacent to the protrusion portion 313p is about 1.6 mm, a first distance d1 obtained by adding the adjustment distance L to the welding standard distance w may be about 5 mm or more.

The first distance d1 may also be similarly applied to the second battery cell 102, and thus, a distance from the edge of the second intermediate hole 312h adjacent to the protrusion portion 313p to the rear end of the round portion 313r may be about 5 mm or more. The distance may also be defined as a distance in the first direction (X direction).

Also, the protrusion portion 313p may be formed to have a predetermined length in the second direction (Y direction). Particularly, a second distance d2 from a portion of the second protrusion portion 102b adjacent to the first battery cell 101 to one-side end of the round portion 313r toward the second battery cell 102 may be about 0.5 mm or more. Here, the second distance d2 may be defined as a distance in the second direction (Y direction).

The second distance d2 may also be similarly applied to the first battery cell 101, and thus, a distance from a portion of the first protrusion portion 101b adjacent to the second battery cell 102 to one-side end of the round portion 313r toward the first battery cell 101 may be about 0.5 mm or more. The distance may also be defined as a distance in the second direction (Y direction).

As such, by setting the second distance d2 to about 0.5 mm or more, it may be possible to prevent the first and second protrusion portions 101b and 102b of the first and second battery cells 101 and 102 from being melted or deformed because a current leaks to the first and second protrusion portions 101b and 102b of the first and second battery cells 101 and 102 when a welding current is applied to the welding rods.

Next, referring to FIG. 7, the protrusion portion 313p may need to be sufficiently spaced apart from the first protrusion portion 101b and the second protrusion portion 102b. For example, the uppermost portion of the protrusion portion 313p may be spaced apart from the top surface of the first and second battery cells 101 and 102 by a certain distance or more such that the first and second protrusion portions 101b and 102b may not contact the substantially-inclined side surface of the protrusion portion 313p.

Particularly, a third distance d3 as a spacing distance between the top surface of the first battery cell 101 and the uppermost portion of the protrusion portion 313p may be about 0.2 mm or more. Likewise, a spacing distance between the top surface of the second battery cell 102 and the uppermost portion of the protrusion portion 313p may also be about 0.2 mm or more. Here, the third distance d3 may be defined as a distance in the height direction (Z direction). For example, considering the protrusion height of the first and second protrusion portions 101b and 102b in the Z direction, the inclined side surface of the protrusion portion 313p extending from the first extension portion 311 and the second extension portion 312 may not contact the first and second protrusion portions 101b and 102b when the third distance d3 is about 0.2 mm or more.

As such, because the protrusion portion 313p is spaced apart from the first and second battery cells 101 and 102, the welding current applied to the extension portions 311 and 312 may be prevented from leaking through the first and second protrusion portions 101b and 102b.

According to an exemplary embodiment described above, the coupling force between the electrode tab and the electrode terminal of the battery cell may be improved by reducing a leakage current generated during welding. Also, the welding efficiency thereof may be improved and thus the cost and time required for welding may be saved.

According to an exemplary embodiment, a battery module capable of improving the coupling force between the electrode tab and the electrode terminal of the battery cell may be provided, and the battery module may be used as an energy source for mobile devices, electric vehicles, hybrid vehicles, or other electric devices and may be used in various forms depending on the types of external devices to which the battery module is applied.

Although certain exemplary embodiments and implementations have been described herein, other embodiments and modifications will be apparent from this description. Accordingly, the inventive concepts are not limited to such embodiments, but rather to the broader scope of the appended claims and various obvious modifications and equivalent arrangements as would be apparent to a person of ordinary skill in the art.

The invention claimed is:

1. A battery module comprising:
a first battery cell comprising a first terminal at a top surface of the first battery cell;
a second battery cell disposed adjacent to the first battery cell in a first direction and comprising a second terminal disposed at a top surface of the second battery cell in substantially parallel to the first terminal; and
an electrode tab electrically connecting the first terminal and the second terminal to each other,
wherein the electrode tab comprises:
a first extension portion coupled to the first terminal and extending along the top surface of the first battery cell in a second direction intersecting the first direction;
a second extension portion coupled to the second terminal and extending along the top surface of the second battery cell in the second direction; and
a connection portion connected to the first extension portion and the second extension portion and comprising a protrusion portion protruding upward with respect to the top surfaces of the first battery cell and the second battery cell,
wherein the protrusion portion of the connection portion connects between the first extension portion and the second extension portion.

2. The battery module of claim 1, further comprising a circuit board disposed to cover at least a portion of the top surfaces of the first battery cell and the second battery cell and comprising a connection hole,
wherein the electrode tab comprises a bent portion bent toward the circuit board and inserted into the connection hole.

3. The battery module of claim 1, wherein the first extension portion comprises a first coupling region welded to the first terminal, and
the second extension portion comprises a second coupling region welded to the second terminal.

4. The battery module of claim 3, wherein the protrusion portion is disposed more adjacent to a center of the first battery cell than the first coupling region and is disposed more adjacent to a center of the second battery cell than the second coupling region.

5. The battery module of claim 3, wherein the first extension portion comprises a first coupling point and a second coupling point contacting the first terminal, and a first intermediate hole formed between the first coupling point and the second coupling point, and
the second extension portion comprises a third coupling point and a fourth coupling point contacting the second terminal, and a second intermediate hole formed between the third coupling point and the fourth coupling point.

6. The battery module of claim 5, wherein the protrusion portion comprises a round portion that is downward convex, and
   a distance between an edge of the first intermediate hole adjacent to the protrusion portion and a rear end of the round portion in the second direction is about 5 mm or more.

7. The battery module of claim 5, wherein the protrusion portion comprises a round portion that is downward convex, and
   a distance between an edge of the second intermediate hole adjacent to the protrusion portion and a rear end of the round portion in the second direction is about 5 mm or more.

8. The battery module of claim 1, wherein the protrusion portion comprises a bottom surface being upward recessed, the bottom surface being adjacent to a space between the first extension portion and the second extension portion.

9. The battery module of claim 5, wherein the protrusion portion is formed to be symmetrical with respect to a center line between the first battery cell and the second battery cell.

10. The battery module of claim 1, wherein the protrusion portion comprises a round portion that is downward convex.

11. The battery module of claim 1, wherein the first battery cell comprises a first protrusion portion protruding upward along a side portion of the top surface of the first battery cell, and the second battery cell comprises a second protrusion portion protruding upward along a side portion of the top surface of the second battery cell.

12. The battery module of claim 11, wherein the protrusion portion comprises a round portion that is downward convex,
   a distance between a portion of the first protrusion portion adjacent to the second battery cell and one side end of the round portion in the second direction is about 0.5 mm or more, and
   a distance between a portion of the second protrusion portion adjacent to the first battery cell and one side end of the round portion in the second direction is about 0.5 mm or more.

13. The battery module of claim 11, wherein the protrusion portion of the connection portion is spaced apart from the first protrusion portion of the first battery cell and the second protrusion portion of the second battery cell.

14. The battery module of claim 1, wherein a spacing distance between the top surface of the first battery cell and an uppermost portion of a bottom surface of the protrusion portion is about 0.2 mm or more, and
   a spacing distance between the top surface of the second battery cell and the uppermost portion of the bottom surface of the protrusion portion is about 0.2 mm or more.

* * * * *